United States Patent
Mayer et al.

(10) Patent No.: US 9,749,824 B2
(45) Date of Patent: Aug. 29, 2017

(54) SELECTIVE MOBILE DEVICE COMPONENT LOCKDOWN IN MOVING VEHICLES

(71) Applicants: Winston Douglas Mayer, West Chester, OH (US); Gary D Foster, Batavia, OH (US)

(72) Inventors: Winston Douglas Mayer, West Chester, OH (US); Gary D Foster, Batavia, OH (US)

(73) Assignee: Foster Products INC., Batavia, OH (US)

( * ) Notice: Subject to any disclaimer, the term of this patent is extended or adjusted under 35 U.S.C. 154(b) by 0 days.

(21) Appl. No.: 14/620,657

(22) Filed: Feb. 12, 2015

(65) Prior Publication Data

US 2016/0242014 A1    Aug. 18, 2016

(51) Int. Cl.
| | |
|---|---|
| *G06F 7/00* | (2006.01) |
| *H04M 3/42* | (2006.01) |
| *H04W 4/18* | (2009.01) |
| *G07C 5/00* | (2006.01) |
| *H04W 4/00* | (2009.01) |

(52) U.S. Cl.
CPC .............. *H04W 4/18* (2013.01); *G07C 5/008* (2013.01); *H04W 4/008* (2013.01)

(58) Field of Classification Search
USPC ........................................ 701/31.5; 455/414.1
See application file for complete search history.

(56) References Cited

U.S. PATENT DOCUMENTS

| | | | |
|---|---|---|---|
| 5,032,828 | A | 7/1991 | Hirose et al. |
| 5,148,153 | A | 9/1992 | Haymond |
| 5,541,572 | A | 7/1996 | Okamoto et al. |
| 5,949,345 | A | 9/1999 | Beckert et al. |
| 6,011,973 | A | 1/2000 | Valentine et al. |
| 6,122,682 | A | 9/2000 | Andrews |
| 6,574,531 | B2 | 6/2003 | Tan et al. |
| 6,690,940 | B1 | 2/2004 | Brown et al. |
| 7,050,907 | B1 | 5/2006 | Janky et al. |
| 7,064,656 | B2 | 6/2006 | Belcher et al. |
| 7,181,229 | B2 | 2/2007 | Singh et al. |
| 7,640,101 | B2 | 12/2009 | Pair et al. |

(Continued)

FOREIGN PATENT DOCUMENTS

| | | |
|---|---|---|
| CN | 201819987 U | 5/2011 |
| CN | 202374321 U | 8/2012 |

(Continued)

OTHER PUBLICATIONS

"U.S. Appl. No. 14/620,657, Response filed May 5, 2006 to Non Final Office Action dated Feb. 5, 2016", 8 pgs.

(Continued)

*Primary Examiner* — Tyler Paige

(74) *Attorney, Agent, or Firm* — Schwegman Lundberg & Woessner, P.A.

(57) ABSTRACT

On-Board Diagnostics (OBDs) produced by a vehicle are monitored in real time. The OBDs are evaluated in view of rules or policies to take actions with respect selective component lockdown of resources for a mobile device that is operational within the vehicle. For example, the display screen of the mobile device is blacked out and locked out when the OBDs indicate the vehicle is moving.

15 Claims, 4 Drawing Sheets

(56) References Cited

U.S. PATENT DOCUMENTS

| | | | |
|---|---|---|---|
| 7,983,840 B2 | 7/2011 | Pair et al. | |
| 9,043,130 B2* | 5/2015 | Ricci | G06F 9/54 340/988 |
| 2005/0181734 A1* | 8/2005 | Coutts | H04W 48/18 455/67.16 |
| 2011/0009107 A1* | 1/2011 | Guba | G08G 1/20 455/418 |
| 2011/0021234 A1 | 1/2011 | Tibbitts et al. | |
| 2011/0264246 A1* | 10/2011 | Pantoja | G06Q 30/02 700/92 |
| 2012/0033654 A1* | 2/2012 | Kalbag | H04W 52/0277 370/338 |
| 2012/0040650 A1* | 2/2012 | Rosen | H04M 3/2218 455/414.1 |
| 2012/0046020 A1 | 2/2012 | Tomasini | |
| 2013/0150004 A1* | 6/2013 | Rosen | H04W 8/22 455/414.1 |
| 2013/0190967 A1* | 7/2013 | Hassib | G06Q 10/00 701/31.5 |
| 2013/0258401 A1* | 10/2013 | Suzuki | G06F 3/1221 358/1.15 |
| 2014/0256303 A1* | 9/2014 | Jones | H04W 4/027 455/418 |
| 2015/0120331 A1* | 4/2015 | Russo | G06Q 40/08 705/4 |
| 2015/0163737 A1* | 6/2015 | Gao | H04W 52/0212 370/311 |
| 2015/0382135 A1* | 12/2015 | Kawahara | H04B 5/02 455/41.1 |

FOREIGN PATENT DOCUMENTS

| | | |
|---|---|---|
| WO | WO-9843192 A1 | 10/1998 |
| WO | WO-0225970 A1 | 3/2002 |
| WO | WO-03028342 A2 | 4/2003 |

OTHER PUBLICATIONS

"Bluetooth OBD-II Interface Adpter, User's Manual Rev. 1", (Mar. 15, 2011), 15 pgs.

"Scosche CellControl Safe Driving System", ©2016 Scosche Industries, [Online]. Retrieved from the Internet: <URL: https://www.att.com/accessories/specialty-items/scosche-cellcontrol-safe-driving-system.html>, (Accessed May 5, 2016), 3 pgs.

Stewart, Marie, "Sensing motion in a mobile phone and limiting functionaltiy of moving phones", Submitted to Distracted Driving Foundation by Marie Stewart, (Jun. 20, 2010), 5 pgs.

* cited by examiner

SELECTIVE MOBILE DEVICE COMPONENT LOCKDOWN IN MOVING VEHICLES

BACKGROUND

Increasingly, consumers are using mobile devices to perform a variety of personal and professional communications. In fact, it seems that individuals lack common sense and are obsessed with mobile communications. This can create significant safety issues for the mobile device users and for innocent bystanders whom are not engaged in mobile communications.

Nowhere is this safety issue more prevalent than when driving a vehicle. There are enough distractions on the road that driving itself may be considered inherently unsafe. But, when drivers take their eyes off the road even for a split second, accidents can and do happen. Numerous studies have shown that interacting with a mobile device, such as a phone, laptop, or tablet while driving increases the likelihood of an accident by orders of magnitude. The chances of an accident are increased even more when the driver is a new or young driver, such as a teenager or college student.

However, a significant number of drivers are actually engaged in work-related activities while driving and need a mobile device to perform their work while on the road. The employers of these workers are concerned for the safety of their workers and also concerned for the safety of innocent bystanders on the same road as their workers. An injured or dead worker involved in an accident is bad for business and results in loss of business while the company deploys a replacement worker. An injured or dead bystander involved in an accident will result in a very costly settlement or lawsuit for the business to compensate the injured bystander or the family of the bystander. In either case, employers do not want their employees using mobile devices while driving and do not want to leave that decision to their employees to make.

Therefore, there is a need for controlling and monitoring mobile device usage within a vehicle.

SUMMARY

Various embodiments of the invention provide a system and methods for selective mobile device component lockdown in moving vehicles. In an embodiment, a method for controlling mobile device usage within a moving vehicle is presented.

Specifically, On-Board Diagnostics (OBDs) produced by a vehicle are filtered. Next, the filtered OBDs are wirelessly communicated to a mobile device application for controlling the mobile device based at least in part on the filtered OBDs.

DETAILED DESCRIPTION

Figure 1:
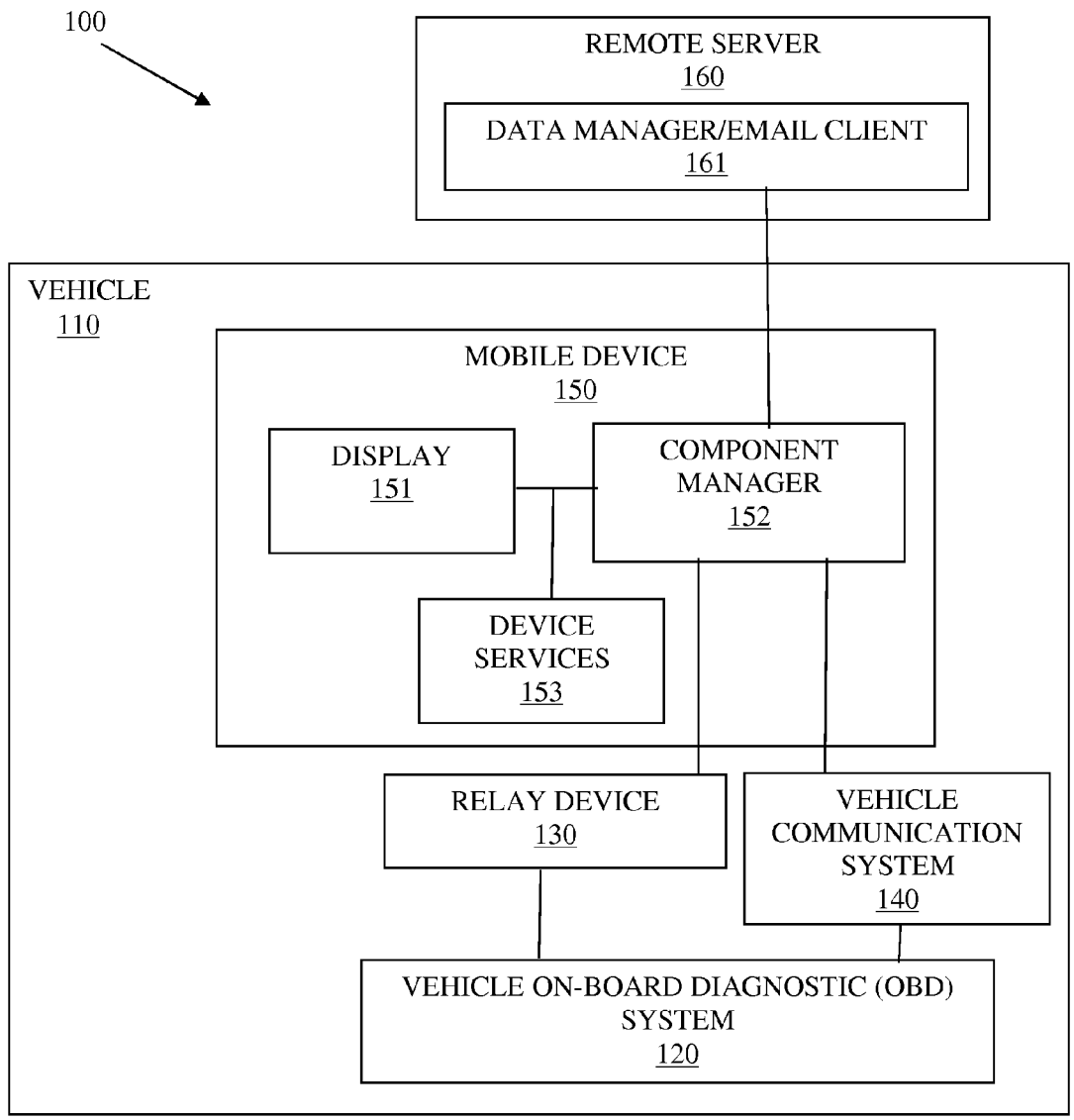
FIG. 1 is a diagram of a system for practicing monitoring and controlling mobile device usage within a moving vehicle, according to an example embodiment.

FIG. 1 is a diagram of a system 100 for practicing monitoring and controlling mobile device usage within a moving vehicle, according to an example embodiment. The components of the system 100 are shown in greatly simplified form with only those components shown necessary for the understanding of the various embodiments of the invention.

As used herein, the user of the phrase "OBD system" may be used synonymously and interchangeably with "Engine Control Module (ECM)." The ECM/OBD system produce "OBD data" referred to herein as just "OBD" or "OBDs."

The system 100 includes a vehicle 110 and a remote server 1260. The vehicle 110 includes a vehicle On-Board Diagnostic (OBD) system 120, optionally, a relay device 130, a vehicle communication system 140, and a portable mobile device 150 present within the vehicle 110. The remote server 160 includes a data manager/email client 161 (implemented as executable instructions that execute on one or processors of the remote server 160 and that reside in memory and/or non-transitory computer-readable storage media). The mobile device 150 (also shown in greatly simplified form with just those components necessary for understanding various embodiments of the invention presented) includes a display 151, a component manager 152 and one or more device services 153 of the mobile device 150. The component manager 152 and the device services 153 are implemented as executable instructions that execute on one or more processors of the mobile device 150 and that reside in memory and/or non-transitory computer readable storage media on the mobile device 150.

The vehicle OBD system 120 also includes a variety of hardware and software components that are integrated within the vehicle 110. In fact, most vehicles (if not all newer vehicles) include a vehicle OBD system 120. Access to the OBD system 120 is achieved via a port that includes a variety of connecting pins to which a cord plugs into. This port is often referred to as an OBD II port, but can be any available device port to acquire the OBD (diagnostic data) from the OBD system 120 (ECM 120). Typically, the OBD system 120 is used by mechanics to obtain diagnostic data about the vehicle 110 to access the health of or problems with the vehicle. However, the OBD system 120 provides a variety of other diagnostic data including such things as speed of vehicle, Global Positioning Satellite (GPS) data (if integrated with an internal navigation system of the vehicle 110), activities with respect to controls of the vehicle 110, status with respect to controls or devices of the vehicle 110, OBD device identifier, and the like.

In an embodiment, the system 100 includes a relay device 130. The relay device 130 connects to the OBD system 120 of the vehicle 110 using an appropriate connecting cord that plugs into the OBD system port pins. The other end of the connecting cord may be manufactured to be integrated into the relay device 130 or the other end of the connecting cord may connect to an input port of the relay device 130, the input port can be any port such as but not limited to a Universal Serial Bus (USB) port, a Video Graphics Array (VGA) port, a serial port, and the others. The relay device 130 also includes a wireless transceiver for establishing a wireless connection to the mobile device 150, and more particularly for communicating with the component manager 152 of the mobile device. The wireless communication can be achieved via Bluetooth®, Low Energy Bluetooth®, Radio Frequency (RF), Near Field Communication (NFC), Wi-Fi (when available), or cellular. Software executing on one or more processors of the relay device 130 collect and filter the diagnostic data provided from the OBD system 120 and selectively communicates the filtered diagnostic data to the component manager 152 of the mobile device 150. The relay device 130 may also detect when wireless communications are unavailable on the mobile device 150 (which may be an indication that it has been turned off by the user) and record such a state. In an embodiment, the relay device 130 may interact with the Operating System (OS) of the mobile device 150 to turn on wireless mechanisms, such as Bluetooth®, when it is detected that the mobile device 150 is not communicating via an available wireless mechanism. In an embodiment, the relay device 130 may also establish a cellular connection with the data manager/email client 161 of the remote server 160 to independently report information when the relay device 130 is unable to communicate with the mobile device 150, such as date and time, vehicle identifier, OBD system identifier, number of attempts to create a wireless connection with the mobile device 150, and the like. Additionally, in an embodiment, the relay device 130, may independently gather remote information when the relay device 130 is able to wireless connect to the mobile device 150, such as actions of the user, state of resources (software, hardware, speed of vehicle, GPS, etc.), date and time the information was gathered, and the like.

In an embodiment, a vehicle communication system 140 is internally capable of retrieving diagnostics from the OBD System 120. In such a scenario, the vehicle communication system 140 establishes a wireless connection with the mobile device 150 and the component manager pulls the OBD diagnostics using an Application Programming Interface (API) of the vehicle communication system 140 to pull and filter the diagnostics from the OBD system 120.

The component manager 152 is initiated and executes on the mobile device 150 when the mobile device 150 is booted or powered on. It is a protected resource of the OS running on the mobile device 150 that cannot be removed or altered by an unauthorized user.

In an embodiment, the component manager 152 is pushed wirelessly to the mobile device 150 for installation when the mobile device 150 has a connection (cellular, Wi-Fi, etc.) to the remote server 160. In an embodiment, the component manager 152 is installed as part of an OS upgrade or patch on the mobile device 150.

The component manager 152, during operation on the mobile device 150, interacts with either the relay device 130 or the vehicle communication system 140 (as discussed above) to collect diagnostics relevant to the vehicle; the diagnostics produced by the OBD system 120.

The component manager 152 is also configured with customized rules or policies with respect to actions to take on the mobile device 150 based on values associated with the received diagnostics. The diagnostics are filtered by either the relay device 130 or by the component manager 152 through API interactions with the vehicle communication system 140. The diagnostics are dynamically streamed in real time from the OBD system 120 to the component manager 152.

One diagnostic received is a current speed of the vehicle and one rule is a permissible speed that the vehicle cannot exceed for a user to continue operating the mobile device 150 while driving the vehicle. For example, a diagnostic value may be received by the component manager 152 indicating that the vehicle is traveling 2 miles per hour and a rule is set for a maximum speed of 1 mile per hour. In response to this situation, the component manager 152 takes a predefined action, such as black out and lock the display 151 screen(s) such that the user cannot use the mobile device 150. This ensures that the user is unable to make a decision to use the mobile device 150 when the vehicle 110 is traveling above 1 mile per hour. Conversely, when the component manager 152 receives a diagnostic value indicating that the speed of the vehicle 110 is 1 or 0 miles per hour, the component manager 152 takes a predefined action to release the lock on the display 161 screen(s) such that the user can again access and use the device services 153 of the mobile device 110.

In an embodiment, customized actions can selective prevent access based on diagnostic values to selective device services 153. For example, notifications from some of the selective device services 153 may be displayable within a screen of the display 151 while the vehicle is traveling below a configured speed, such as 10 miles per hour but interaction with the display 151 is still prohibited. In another case, audio notifications may be permitted at any speed from the device services 153 but the display 151 remains blacked out or locked out. Some device services 153 may permit two-way audio communication while the vehicle 110 is traveling at any speed but the display remains blacked out or locked out to prevent the user from even attempting to look at the display 151.

The component manager 152 can also capture and report some of the diagnostics without any user action or direction to the data manager/email client (via an email to a preconfigured email address) 161 of the remote server 160. For instance, if a diagnostic value indicates that the vehicle 110 is exceeding a speed limit, the component manager 152 can flag the event and report it out via email or to a data manager or the remote server 160. GPS data can also be reported to show where the driver is or was during normal work hours and the rate of speed and direction of travel. Moreover, if the user attempts to remove the component manager 152, shut the component manager 152 down, or disable wireless communications to the mobile device 150, these on device (on the mobile device 150) user actions can be logged and reported.

In fact, the component manager 152 is configurable based on rules and/or policies to define what diagnostic data from the OBS system 120 is reported and when (timing of such report out) and what actions taken by the user on the mobile device 150 are reported and when (time of such report out). Some rules or policies may dictate immediate report out whereas others may be periodically reported out at a configured interval.

The actions taken by the component manager 152 is also configurable in view of the rules and/or policies when provided with diagnostic data from the OBD system 120 or when provided with actions taken by the user with respect to the device services 153 or other resources of the mobile device 150.

A primary action that the component manager 152 is also configured to take is to black out and lock out the display 151 when the vehicle 110 is moving. This does not mean that the devices services 153 do not continue to execute on the mobile device 150, just that the user cannot manually interact with such device services 153 through the mobile device's display input mechanism and just that the user cannot visually see anything on the display 151. In an embodiment, the component manager 152 locks out and prevents use of any input mechanism associated with the mobile device 150, such as and by way of example only, touchscreen, keyboard, mouse, voice input, Human Input Device (HID), and others. In an embodiment, the GPS video of the vehicle is locked out as well.

In an embodiment, the mobile device 150 is a tablet.

In an embodiment, the mobile device 160 is a phone.

In an embodiment, the mobile device 150 is a wearable processing device (glasses, watch, etc.).

In an embodiment, the mobile device 150 is a laptop.

One now appreciates how safety can be achieved with respect to using mobile devices within a moving vehicle. Moreover, selective control of using those mobile devices can be achieved as well as monitoring and reporting (relevant to employers and/or parents).

The above-discussed embodiments and other embodiments are now discussed with reference to the FIGS. 2-4.

Figure 2:
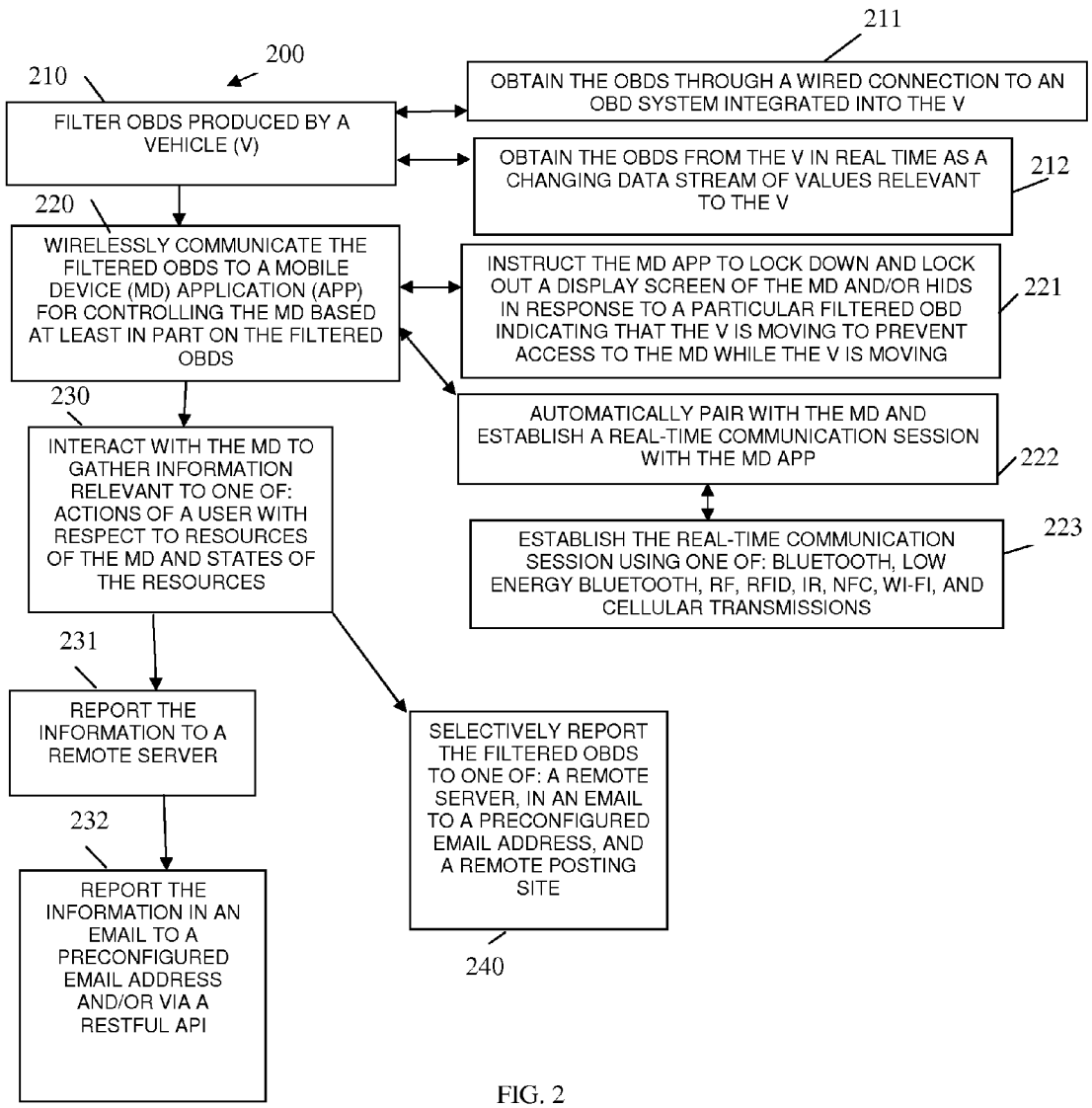
FIG. 2 is a diagram of a method for controlling mobile device usage within a moving vehicle, according to an example embodiment.

FIG. 2 is a diagram of a method 200 for controlling mobile device usage within a moving vehicle, according to an example embodiment. The method 200 is implemented as one or more software modules (herein after referred to as "mobile device controller"). The mobile device controller includes executable instructions that are implemented, programmed, and resides within memory and/or a non-transitory machine-readable storage media; the executable instructions execute on one or more processors of a device and have access to one or more network connections associated with one or more networks. The networks may be wired, wireless, or a combination of wired and wireless.

In an embodiment, the device that executes the mobile device controller is the relay device 130 of the FIG. 1.

In an embodiment, the device that executes the mobile device controller is integrated into the vehicle 110 and the mobile device controller has access to the vehicle communication system 140 of the FIG. 1.

In an embodiment, the device that executes the mobile device controller is integrated into the vehicle 110 and integrated into the OBD system 120 of the FIG. 1.

At 210, the mobile device controller filters OBDs produced by a vehicle through an OBD system integrated into the vehicle. That is, since the OBD system may produce a large volume of diagnostics, the mobile device controller uses one or more customized filters to reduce the volume to that which is relevant to controlling the mobile device or resources of the mobile device. Resources can include software services (applications), files, device hardware components (display), ports, etc.

In an embodiment, at 211, the mobile device controller obtains the OBDs through a wired connection to the OBD system integrated into the vehicle. Various wired connections were discussed above with respect to the FIG. 1.

According to an embodiment, at 212, the mobile device controller obtains the OBDs through a wireless connection to the OBD system integrated into the vehicle. This can be done with a wireless adapted plugged into an OBD system interface port that wirelessly communicates the OBDs. In an embodiment, the wireless interface is built into and integrated into the OBD system. In an embodiment, the OBD system is accessible to the vehicle's communication system (such as Bluetooth®) and the vehicles communication system (using the ECM/OBD system) wirelessly communicates with the OBDs (the diagnostic data).

In an embodiment, at 213, the mobile device controller obtains the OBDs from the vehicle in real time as a changing data stream of values relevant to the vehicle. That is, as soon as detectable conditions of the vehicle's OBD system are detected by the OBD system the OBDs are streamed to the mobile device controller for filtering and further use as discussed above and below.

At 220, the mobile device controller wirelessly communicates the filtered OBDs to a mobile device application for controlling a mobile device based at least in part on the filtered OBDs. This can be accompanied with an instruction sent to the mobile device application that directs the mobile device application to perform some controlling operation or action on the mobile device. Alternatively, the mobile device application can independently perform the controlling operation or action based on its own independent evaluation of the filtered OBDs.

So, according to an embodiment, at 221, the mobile device controller instructs the mobile device application to lock down and lock out a display screen of the mobile device and/or some or all HIDs associated with the mobile device in response to a particular filtered OBD indicating that the vehicle is moving to prevent access to the mobile device while the vehicle is moving.

In an embodiment, at 222, the mobile device controller automatically pairs with the mobile device and establishes a real-time communication session with the mobile application.

In an embodiment of 222 and at 223, the mobile device controller establishes the real-time communication session using one of: Bluetooth®, Low Energy Bluetooth®, Radio Frequency (RF), RFID, Infrared (IR), Near Field Communication (NFC), Wi-Fi, and cellular transmissions.

According to an embodiment, at 230, the mobile device controller interacts with the mobile device to gather information relevant to one or more of: actions of the user with respect to resources of the mobile device and states of the resources.

In an embodiment of 230 and at 231, the mobile device controller reports the information to a report server, such as the remote server 160 through data manager 161 of the FIG. 1.

In an embodiment of 230 and at 232, the mobile device controller reports the information in an email to a preconfigured email address, such as through email client 161 of the FIG. 1, and/or the mobile device control reports the information via a RESTful (Representational State Transfer (REST)) Application Programming Interface (API).

According to an embodiment, at 240, the mobile device controller selectively reports the filtered OBDs to one or more of: a remote server, in an email to a preconfigured email address, a database, a website, a File Transfer Protocol (FTP) site, a Hypertext Transfer Protocol (HTTP) site, an HTTP over Secure Socket Layer (SSL) HTTPS site, an Internet Protocol Address for a site, a remote posting site, and the like.

Figure 3:
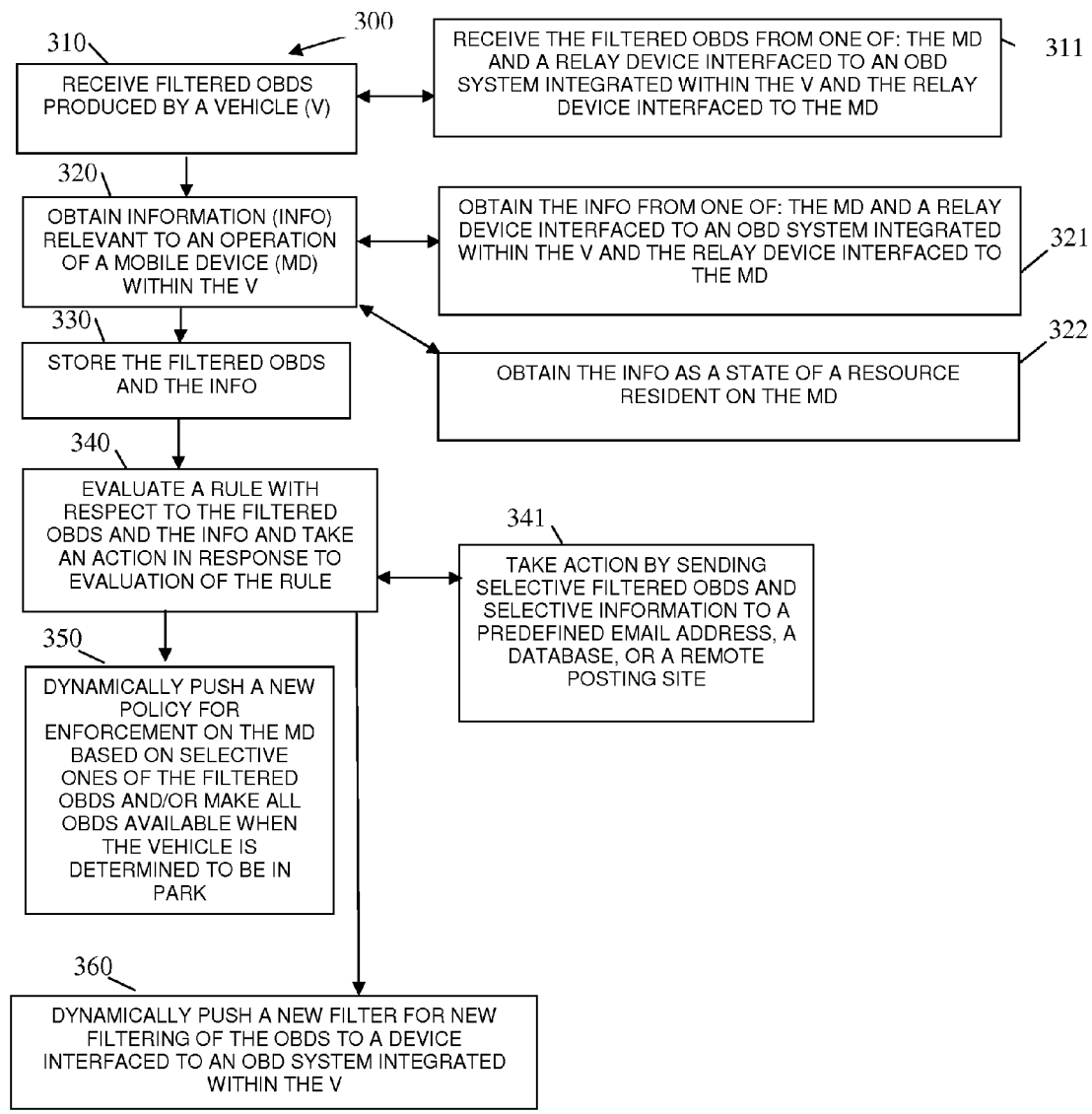
FIG. 3 is a diagram of a method for monitoring mobile device usage within a moving vehicle, according to an example embodiment.

FIG. 3 is a diagram of a method 300 for monitoring mobile device usage within a moving vehicle, according to an example embodiment. The method 300 is implemented as one or more software module(s) (herein after referred to as "mobile device monitor") on a device. The mobile device monitor is represented as executable instructions that are implemented, programmed, and resides within memory and/or a non-transitory machine-readable storage medium; the executable instructions execute on one or more processors of a server and have access to one or more network connections associated with one or more networks. The networks may be wired, wireless, or a combination of wired and wireless.

In an embodiment, the mobile device monitor executes on the remote server 160 of the FIG. 1.

In an embodiment, the mobile device monitor is the data manager 161 of the FIG. 1.

At 310, the mobile device monitor receives filtered OBDs produced by a vehicle.

According to an embodiment, at 311, the mobile device monitor receives the filtered OBDs from one of: the mobile device and a relay device (such as relay device 130 of the FIG. 1) interfaced to an OBD system integrated within the vehicle and the relay device also wirelessly interfaced to the mobile device.

At 320, the mobile device monitor obtains information relevant to an operation or a mobile device within the vehicle. The operation can be a failed operation such as an attempt to turn on a wireless mechanism on the mobile device, and the like.

In an embodiment, at 321, the mobile device monitor obtains the information from one of: the mobile device and relay device (such as relay device 130 of the FIG. 1) interfaced to an OBD system integrated within the vehicle, and the relay device also interfaced to the mobile device.

According to an embodiment, at 322, the mobile device monitor also obtains the information as a state of a resource resident on the mobile device, such as condition of a wireless transceiver, a display, a specific mobile device service, and the like.

At 330, the mobile device monitor stores the filtered OBDs and the information. This can be used for dynamic configuration or rules or policies and/or for mining and compliance auditing.

At 340, the mobile device monitor evaluates a rule with respect to the filtered OBDs and the information and takes an action in response to the evaluation of the rule.

According to an embodiment, at 341, the mobile device monitor takes the action by sending an email with selective filtered OBDs and selective information to a predefined email address and/or the mobile device monitor sends the selective filtered OBDS and the selective information to a database and/or a remote posting site.

In an embodiment, at 350, the mobile device monitor performs one or more of: dynamically pushes a new policy for enforcement on the mobile device based on selective ones of the filtered OBDs and makes all OBDS available when it is determined that the vehicle is in park (no speed detected from the OBDS for the vehicle). This is a dynamic reconfiguration of actions or entirely new actions for the mobile device to take.

In an embodiment, at 360, the mobile device monitor dynamically pushes a new filter for new filtering of the OBDs to a device interfaced to the OBD system integrated within the vehicle. This is a dynamic update or new filtering performed on the obtained OBDs.

Figure 4:
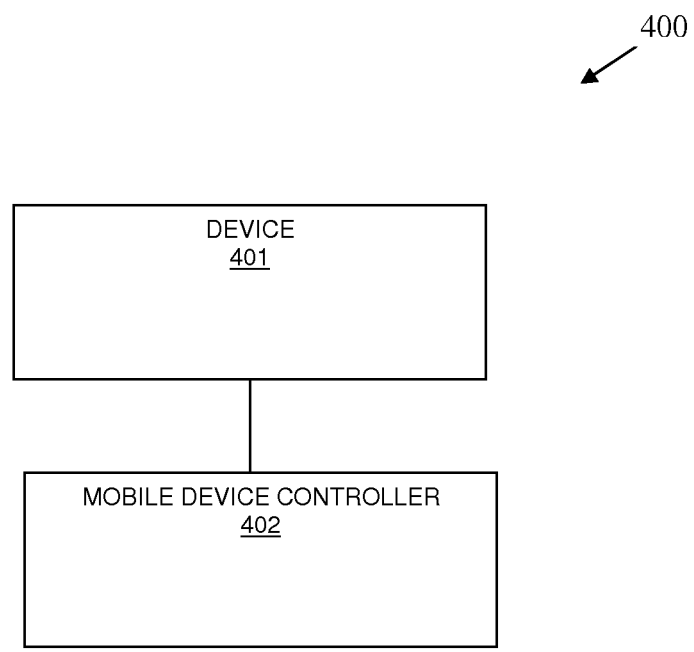
FIG. 4 is a diagram of a mobile device controlling and monitoring system, according to an embodiment.

FIG. 4 is a diagram of a mobile device controlling and monitoring system 400, according to an embodiment. Various components of the mobile device controlling and monitoring system 400 are hardware and software module(s); the software modules represented as executable instructions, which are programed and/or reside within memory and/or non-transitory computer-readable storage media for execution by one or more hardware devices. The components and the devices have access to one or more network connections over one or more networks, which are wired, wireless, or a combination of wired and wireless.

According to an embodiment, the mobile device controlling and monitoring system 400 implements, in whole or in part and inter alia, various features of the FIGS. 1-3. Thus, all processing discussed above with respect to the prior FIGS. are incorporated by reference herein with respect to the mobile device controlling and monitoring system 400 and the discussion of the FIG. 4.

The mobile device controlling and monitoring system 400 includes a device 401 and a mobile device controller 402.

The device 401 is adapted and configured to collect and to filter OBDs produced by a vehicle.

In an embodiment, the device 401 is the relay device 130 of the FIG. 1.

In an embodiment, the device 401 is integrated into the vehicle.

In an embodiment, the device 401 is the mobile device being controlled and monitored.

The mobile device controller 402 is configured and adapted to: execute on the device or a different device, apply rules to the filtered OBDs, take actions to control one or more resources of a mobile device operational within the vehicle, and report information to a remote server relevant to one or more of: the filtered OBDs, the actions, and other actions taken by a user with respect to one or more resources of the mobile device.

In an embodiment, the mobile device controller 402 executes on the relay device 130 of the FIG. 1.

In an embodiment, the mobile device controller 402 executes on the mobile device as a mobile application.

According to an embodiment, the mobile device controller 402 is further adapted and configured to lock down and black out a display screen of the mobile device and/or any or all HIDs of the mobile device when a particular filtered OBD indicates that the vehicle is exceeding a speed defined in a particular rule.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
executing, a mobile device controller on a relay device that is interfaced to an On-Board Diagnostics (OBD) port of a vehicle;
filtering, by the mobile device controller, OBDs produced by the vehicle; and
wirelessly communicating, by the mobile device controller through the relay device, the filtered OBDs to a mobile device application executing on a mobile device for controlling the mobile device based at least in part on the filtered OBDs, wherein wireless communicating further includes interacting with an Operating System (OS) of the mobile device for turning on a wireless communication mechanism of the mobile device when detecting that the mobile device is not communicating via the wireless communication mechanism before wirelessly communicating with the mobile device, and wherein wirelessly communicating further includes instructing, by the mobile device controller, the mobile device application to lock down and lock out a display screen of the mobile device in response to a particular filtered OBD indicating that the vehicle is moving to prevent access to the display screen of the mobile device while the vehicle is moving and permitting while the display screen of the mobile device is locked down the mobile device to conduct two-way audio communications.

2. The method of claim 1, wherein filtering further includes obtaining the OBDs through a wireless connection to an OBD system integrated into the vehicle.

3. The method of claim 1, wherein filtering further includes obtaining the OBDs from the vehicle in real time as a changing data stream of values relevant to the vehicle.

4. The method of claim 1, wherein automatically pairing further includes establishing the real-time communication session using one of:
Bluetooth®, Low Energy Bluetooth®, Radio Frequency, Radio Frequency Identifier, Infrared, Near Field Communication, Wi-Fi, and cellular transmissions.

5. The method of claim 1 further comprising, interacting, by the mobile device controller, with the mobile device to gather information relevant to one of:
actions of a user with respect to resources of the mobile device and states of the resources.

6. The method of claim 5 further comprising, reporting, by the mobile device controller, the information to remote server.

7. The method of claim 5 further comprising, reporting, by the mobile device controller, the information in an email to a preconfigured email address.

8. The method of claim 1 further comprising, selectively reporting, by the mobile device controller, the filtered OBDs to one of:
a remote server, in an email to a preconfigured email address, a remote posting site, and via a RESTful (Representational State Transfer (REST)) Application Programming Interface (API).

9. A method, comprising:
receiving, by a server, filtered On-Board Diagnostics (OBDs) produced by a vehicle, wherein receiving further includes receiving the OBDs from a relay device interfaced to an OBD port of the vehicle;
obtaining, by the server, information relevant to an operation of a mobile device within the vehicle, and wherein obtaining further includes obtaining the information from a protected resource executing on the mobile device;
storing, by the server, the filtered OBDs and the information; and
evaluating, by the server, a rule with respect to the filtered OBDs and the information and taking an action in response to evaluation of the rule.

10. The method of claim 9 further comprising, processing one of:
dynamically pushing, by the server, a new policy for enforcement on the mobile device to the relay device that interacts with the protected resource of the mobile device and pushing the new policy based on selective ones of the filtered OBDs; and
making all OBDs available when the vehicle is determined to be in park.

11. The method of claim 9 further comprising, dynamically pushing, by the server a new filter for new filtering of the OBDs to the relay device interfaced to an OBD system integrated within the vehicle.

12. The method of claim 9, wherein obtaining further includes obtaining the information as a state of the protected resource resident on the mobile device.

13. The method of claim 9, wherein evaluating further includes taking the action by one of:
sending an email with selective filtered OBDs and selective information to a predefined email address and sending the selective filtered OBDs and the selective information to a database and/or remote posting site.

14. A system, comprising:
a relay device adapted and configured to collect and to filter On-Board Diagnostics (OBDs) produced by a vehicle, the relay device coupled to an OBD port within the vehicle; and
a mobile device controller adapted and configured to execute on the relay device and interact with a protect resource of the mobile device, the protected resource executed on the mobile device when the mobile device is booted and powered on as a protected resource, the mobile device controller further configured to:
i) apply rules to the filtered OBDs, ii) take actions to instruct the mobile application to lock down and black out a display screen of the mobile device but permit two-way audio calls on the mobile device while the display screen is locked down and blacked out, iii) report information to a remote server relevant to one or more of:
the filtered OBDs, the actions, and other actions taken by a user with respect to one or more resources of the mobile device as reported to the mobile device controller from the mobile application during operation of the mobile device within the vehicle, and iv) turn on a wireless communication mechanism of the mobile device through interaction by the mobile device controller with an Operating System of the mobile device when detecting that the wireless communication mechanism is off for the mobile device and initiate the mobile application on the mobile device.

15. The system of claim 14, wherein the mobile device controller is further adapted and configured, in ii), to one of:
a) lock down and black out the display screen of the mobile device when a particular filtered OBD indicates that the vehicle is exceeding a speed defined in a particular rule and b) lock down some Human Input Devices associated with the mobile device through communication from the mobile device controller with the mobile application.

* * * * *